(12) United States Patent
Cherry et al.

(10) Patent No.: US 10,127,367 B2
(45) Date of Patent: Nov. 13, 2018

(54) PERSONAL IDENTIFICATION SYSTEM HAVING A CONTACT PAD FOR PROCESSING BIOMETRIC READINGS

(71) Applicant: CIRCURRE PTY LTD, Ashmore (AU)

(72) Inventors: Peter Cherry, Gilston (AU); Aaron Cope Maher, Bentleigh East (AU); Dion Jaye Maher, Ashburton (AU)

(73) Assignee: CIRCURRE PTY LTD, Ashmore QLD. (AU)

( * ) Notice: Subject to any disclaimer, the term of this patent is extended or adjusted under 35 U.S.C. 154(b) by 126 days.

(21) Appl. No.: 15/112,590

(22) PCT Filed: Jan. 21, 2015

(86) PCT No.: PCT/AU2015/000026
§ 371 (c)(1),
(2) Date: Jul. 19, 2016

(87) PCT Pub. No.: WO2015/109360
PCT Pub. Date: Jul. 30, 2015

(65) Prior Publication Data
US 2016/0335426 A1 Nov. 17, 2016

(30) Foreign Application Priority Data
Jan. 21, 2014 (AU) ................. 2014900181

(51) Int. Cl.
*G06F 21/00* (2013.01)
*G06F 21/32* (2013.01)
(Continued)

(52) U.S. Cl.
CPC .......... *G06F 21/32* (2013.01); *G06F 21/6245* (2013.01); *G06K 19/0718* (2013.01); *G06Q 20/40* (2013.01); *G06Q 20/40145* (2013.01)

(58) Field of Classification Search
CPC ................ G06F 21/32; G06F 21/6245; G06Q 20/40145; G06Q 20/40; G06K 19/0718
See application file for complete search history.

(56) References Cited

U.S. PATENT DOCUMENTS 4,582,985 A 4/1986 Lofberg
5,229,764 A 7/1993 Matchett et al.
(Continued)

FOREIGN PATENT DOCUMENTS

JP 2003093368 A 4/2003
JP 2005505026 A 2/2005
(Continued)

OTHER PUBLICATIONS

Co-pending application Publication No. WO2014/015386 A1, International Application No. PCT/AU2013/000834 with international search report, filed Jul. 26, 2013.
(Continued)

*Primary Examiner* — Jeffrey C Pwu
*Assistant Examiner* — William A Corum, Jr.
(74) *Attorney, Agent, or Firm* — Avery N. Goldstein; Blue Filament Law, PLLC

(57) ABSTRACT

The present invention provides a device (10) for facilitating an exchange of personal information between a user and a third party. The device comprises a body (12) configured to be carried by a user. A contact pad (14) is provided on a surface of the body (12). The contact pad (14) is configured to be contacted by the user and comprises a plurality of sensor elements (25) for taking a plurality of biometric readings from the user for verification purposes. A data storage module (29) is provided with said body (12) for storing personal data about said user together with said user's biometric data. A processor (28) is provided for processing the biometric readings obtained by the plurality
(Continued)

of sensor elements (25) and comparing the biometric readings against the user's stored biometric data to confirm identity of the user. The processor (28) is further configured to facilitate a transfer of said user's personal data with the third party upon confirmation of the identity of the user. A power supply (30) is provided with the body (12), the power supply (30) is selectively connectible to the processor (28) to supply power to the processor (28) when the identity of the user is confirmed.

18 Claims, 6 Drawing Sheets

(51) Int. Cl.
   *G06Q 20/40* (2012.01)
   *G06K 19/07* (2006.01)
   *G06F 21/62* (2013.01)

(56) References Cited

U.S. PATENT DOCUMENTS

| | | | |
|---|---|---|---|
| 5,719,950 | A | 2/1998 | Osten et al. |
| 5,872,834 | A | 2/1999 | Teitelbaum |
| 8,130,078 | B2 | 3/2012 | Tassy et al. |
| 2004/0129787 | A1 | 7/2004 | Saito et al. |
| 2004/0133787 | A1 | 7/2004 | Doughty et al. |
| 2005/0240778 | A1 | 10/2005 | Saito |
| 2006/0000894 | A1 | 1/2006 | Bonalle et al. |
| 2007/0198712 | A1 | 8/2007 | Mani et al. |
| 2008/0120509 | A1 | 5/2008 | Simon |
| 2008/0148393 | A1 | 6/2008 | Wendt |
| 2008/0223925 | A1* | 9/2008 | Saito .................... G06Q 20/341 235/380 |
| 2009/0150994 | A1* | 6/2009 | Evans .................... G06F 21/32 726/20 |
| 2010/0071031 | A1 | 3/2010 | Carter et al. |
| 2012/0218079 | A1 | 8/2012 | Kim |
| 2012/0286847 | A1 | 11/2012 | Peshkin et al. |
| 2013/0207786 | A1 | 8/2013 | Hutzler et al. |
| 2014/0089243 | A1* | 3/2014 | Oppenheimer ......... G06F 21/50 706/46 |
| 2015/0294312 | A1 | 10/2015 | Kendrick et al. |
| 2017/0272421 | A1* | 9/2017 | Murakami ............. G06F 21/32 |
| 2017/0293749 | A1 | 10/2017 | Baek et al. |

FOREIGN PATENT DOCUMENTS

| | | |
|---|---|---|
| JP | 2005202505 A | 7/2005 |
| JP | 2006501583 A | 1/2006 |
| JP | 2006119810 A | 5/2006 |
| JP | 2006134144 A | 5/2006 |
| JP | 2007535073 A | 11/2007 |
| JP | 2012190096 A | 10/2012 |
| WO | 2006014205 A2 | 2/2006 |
| WO | 2007022423 A2 | 2/2007 |
| WO | 2007110142 A1 | 10/2007 |
| WO | 2009076525 A1 | 6/2009 |
| WO | 2010105250 A1 | 9/2010 |
| WO | 2013103994 A2 | 7/2013 |

OTHER PUBLICATIONS

Australian Search Report dated Jul. 19, 2013 from co-pending Australian Application No. 2013204744 filed Jul. 26, 2012.
European Search Report dated Jan. 4, 2016 from co-pending European Application No. 13823666 filed Jul. 26, 2013.
English translation of Japanese Search Report dated Mar. 15, 2016 from co-pending Japanese Application No. 2015-53346 filed Jul. 26, 2013.
European Search Report dated Aug. 10, 2017 for European Application No. 15741074 filed Jan. 21, 2015.

* cited by examiner

PERSONAL IDENTIFICATION SYSTEM HAVING A CONTACT PAD FOR PROCESSING BIOMETRIC READINGS

RELATED APPLICATION

The present application claims priority from Australian Provisional Patent Application No. 2014900181 filed 21 Jan. 2014, the entire contents of which are incorporated herein by reference.

FIELD OF INVENTION

The present invention relates generally to a system and method for identifying an individual based on an analysis of one or more biometric readings taken from the individual, and in particular, to a system and method for identifying an individual for facilitating secure transactions of personal information.

BACKGROUND OF THE INVENTION

The use of personal devices to store user information for electronic transfer between a source and the owner of the personal device is commonplace. The most common form of such a personal device is a credit card that stores information relating to the user's financial details such that by merely transferring information between the credit card and a merchant, a financial transaction can be completed without the need for any physical exchange of money between the user and the merchant.

Similarly, many passports contain electronic chips which store personal information about the passport holder which can be simply exchanged between an appropriate reading device at a passport checking station to receive and review the personal information about the passport holder. Such a transfer of information is both convenient and simple so as to greatly improve processing of passport holders at airports and other appropriate checking stations.

The ability to store a variety of personal information conveniently on a personal device, such as a card, provides for a convenient and simple system for exchange of information between parties. However, such systems also increase the potential for such personal information to be easily acquired and used by other parties without the owner's knowledge or authorisation. This is commonly referred to as identity theft and enables other parties who acquire the personal information of the card owner to use this information to access the card owner's bank account details or similar private possessions and engage in criminal activity.

A variety of solutions have been proposed to make personal devices, such as credit cards, more secure and prevent identity theft. Such solutions have incorporated the provision of passwords in association with the devices such that the device can only be used after they are activated by the entry of a unique code or password. Similarly, some devices have also incorporated the provision of a sensor device to obtain a biometric reading from the user, such as a fingerprint reading, which can be compared with a stored biometric reading to determine whether the user is authorised to use the card.

The present Applicant has proposed an improved means for using biometric information to prevent fraud in the usage of smart cards and the like in their co-pending International PCT Patent Application No. PCT/A112013/000834. This application discloses an improved method for controlling the exchange of information and activating the card upon determination of a match between the biometric information detected and that stored within the device.

A problem with most existing systems that read biometric information in order to validate a transaction is that they typically employ fingerprint reading technologies that can be simply bypassed or circumvented to access the data. Thus there is a need to provide a more secure means for obtaining a variety of different biometric information from a user to validate the user so as to prevent unauthorised access to information.

The above references to and descriptions of prior proposals or products are not intended to be, and are not to be construed as, statements or admissions of common general knowledge in the art. In particular, the above prior art discussion does not relate to what is commonly or well known by the person skilled in the art, but assists in the understanding of the inventive step of the present invention of which the identification of pertinent prior art proposals is but one part.

STATEMENT OF INVENTION

The invention according to one or more aspects is as defined in the independent claims. Some optional and/or preferred features of the invention are defined in the dependent claims.

Accordingly, in one aspect of the invention there is provided a device for facilitating an exchange of personal information between a user and a third party comprising:
 a body configured to be carried by a user;
 a contact pad provided on a surface of the body, the contact pad being configured to be contacted by the user and comprises a plurality of sensor elements for taking a plurality of biometric readings from the user for verification purposes;
 a data storage module provided with said body for storing personal data about said user together with said user's biometric data;
 a processor for processing said biometric readings obtained by the plurality of sensor elements and comparing said biometric readings against the user's stored biometric data to confirm identity of the user, the processor being further configured to facilitate a transfer of said user's personal data with the third party upon confirmation of the identity of the user; and
 a power supply provide with said body, the power supply being selectively connectible to the processor to supply power to the processor when the identity of the user is confirmed.

In one embodiment, the body comprises a card. The card may be a credit card or smart card for use in financial transactions.

The contact pad may comprise a contact surface having a plurality of sensor elements embedded therein. The plurality of sensor elements may be arranged in one or more layers to provide a plurality of biometric readings from said user when said user is in contact with said contact pad. The contact pad may be configured to receive a finger or thumb of said user.

At least one of the plurality of sensor elements may comprise a sensor element for measuring the electrokinetic energy of the user upon contact with the contact pad. The processor may be configured to detect the electrokinetic energy of the user in the absence of power supplied by the power supply to determine that the user is in a live state. The processor, upon detecting the presence of electrokinetic energy, may connect the power supply to the processor for supplying power thereto.

At least one of the plurality of sensors may further comprise a sensor element for measuring at least one of electrocardiography data, electromyogram data, pulse oximetry data, arterial pulse data, trans hand impedance data of the user.

The data storage module may comprise a memory for storing said personal data and said user biometric data. The personal data stored in said memory may comprise data associated with said user's financial and/or private particulars.

According to another aspect of the present invention, there is provided a method for verifying an identity of a user of a device for facilitating an exchange of information between the user and a third party, comprising:

facilitating direct contact between the user and the device;
determining the presence of electrokinetic energy associated with said direct contact;
upon determining the presence of electrokinetic energy associated with said direct contact:
facilitating the supply of electrical power to said device;
obtaining a biometric reading from said user through said direct contact;
assessing whether the obtained biometric reading from said user matches with a stored biometric reading taken from a registered user of the device;
disrupting the supply of electrical power to said device to prevent further use of said device by the user when said obtained biometric reading does not match said stored biometric reading of said registered user;
determining whether a level of security set for said exchange of information has been met when said obtained biometric reading matches said stored biometric reading of said registered user; and
facilitating said exchange of information between said user and said third party upon said level of security being met.

The step of facilitating direct contact between the user and the device may comprise providing a contact pad on said device for receiving said user's finger or thumb thereon. The contact pad may comprise a plurality of sensor elements for taking a plurality of biometric readings from said user.

The step of determining the presence of electrokinetic energy associated with said direct contact may comprise one of said plurality of sensor elements detecting said electrokinetic energy. Upon said sensor element not detecting the presence of electrokinetic energy associated with the direct contact, the device may be retained in a deactivated state.

The step of facilitating the supply of electrical power to the device may comprise a processor provided with said device selectively connecting the device to the power supply.

The step of obtaining a biometric reading from said user through said direct contact may comprise obtaining any one or more of one of electrokinetic energy data, electrocardiography data, electromyogram data, pulse oximetry data, arterial pulse data, trans-hand impedance data from the plurality of sensor elements.

The step of determining whether the level of security set for the exchange of information has been set may comprise determining whether the number of assessments of the obtained biometric data against the stored biometric data has been met. If the level of security set for the exchange of information has not been met, further assessments of the obtained biometric data against the stored biometric data may be made.

According to another aspect of the invention, there is provided a system for verifying an identity of a user to facilitate an exchange of information between the user and a third party, comprising:

one or more sensor devices associated with said user, each sensor device being configured to obtain a biometric reading from the user;
a personal device carried by the user, the personal device being configured to receive the one or more biometric readings from the one or more sensor devices and to process the biometric readings to determine a biometric function for the user based on said biometric readings;
wherein the personal device is further configured to compare the determined biometric function for the user against a stored biometric function stored on the personal device associated with a registered user for that personal device, and should the determined biometric function substantially correspond with the stored biometric function, exchange of information is facilitated between the user and the third party.

According to yet another aspect of the invention, there is provided a method for verifying an identity of a user of a device for facilitating an exchange of information between the user and a third party, comprising:

obtaining a plurality of biometric readings from one or more sensor devices associated with a user;
processing a plurality of the biometric readings to form a combined biometric function for the user;
comparing the combined biometric function for the user against a predetermined biometric function associated with a registered user of that device;
determining whether the user is the registered user of the device; and
facilitating the exchange of information between the user and the third party upon determination that the user is the registered user.

BRIEF DESCRIPTION OF THE DRAWINGS

The invention may be better understood from the following non-limiting description of preferred embodiments, in which.

DETAILED DESCRIPTION OF THE DRAWINGS

Preferred features of the present invention will now be described with particular reference to the accompanying drawings. However, it is to be understood that the features illustrated in and described with reference to the drawings are not to be construed as limiting on the scope of the invention.

The present invention will be described below in relation to a card for performing financial transactions over a network in a secure and controlled manner. However, it will be appreciated that the present invention may be employed to facilitate a variety of secure transactions or exchanges of information for a variety of different purposes, while still embodying the spirit of the present invention. Further, the device of the present invention may take a variety of forms other than a card, as would be appreciated by those skilled in the art. In this regard, the present invention could be employed as part of a system and method for fraud prevention, as discussed in the Applicant's co-pending International PCT Patent Application No. PCT/AU2013/000834, the entire contents of which are incorporated herein by reference.

Figure 1:
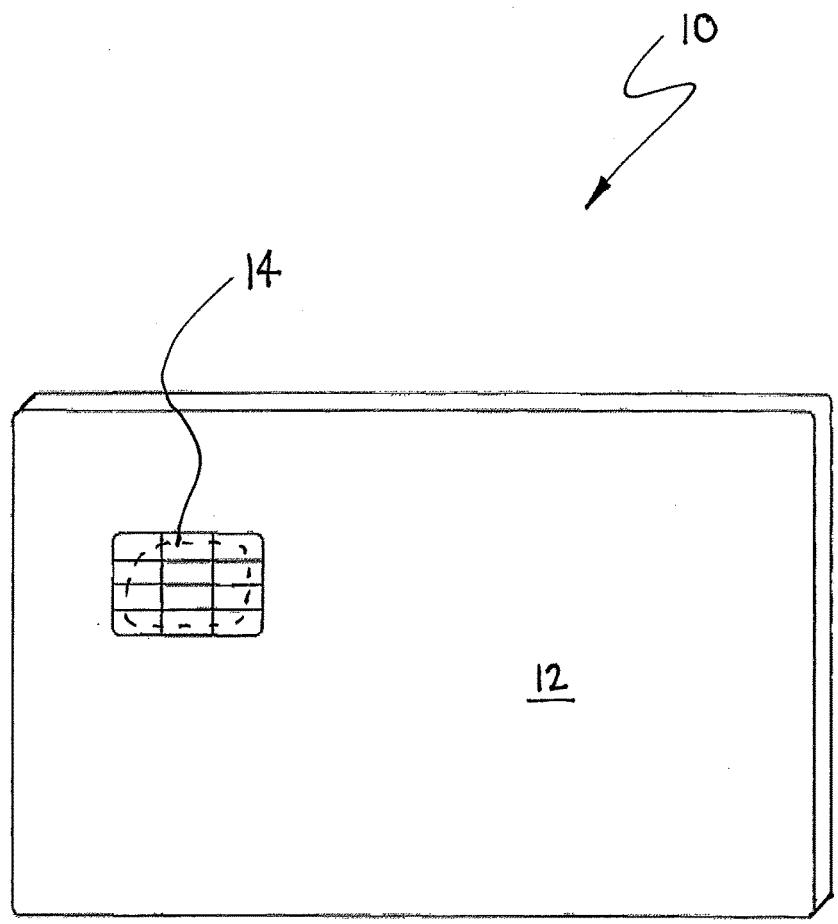
FIG. 1 is a depiction of an embodiment of a personal device incorporating the features of the present invention.

Referring to FIG. 1, there is depicted a card 10 in accordance with an embodiment of the present invention. The card 10 may be a smartcard, credit card or digital wallet that stores information about the user and is carried by the user for use in a variety of different applications, such as performing financial transactions or proving the user's identity.

The card 10 generally comprises a body 12 made from a sufficiently rigid material, such as a plastic material having sufficient rigidity and durability. The card 10 may contain electronic circuitry embedded therein which stores and processes information to facilitate a transaction between the registered user of the card 10 and a third party, such as a merchant or trader. The manner in which the electronic circuitry embedded within the card 10 is configured will be described in more detail below. However, the card generally comprises a transmitter for transmitting information to a linked communication device to facilitate use of the device. The linked communication device may be any number of common communication devices such as a smart phone or tablet containing appropriate compatible software, or a merchant transmission device for facilitating financial transaction over a secure network.

The card 10 comprises a sensor device 14, such as a contact pad, that acts to control the manner in which the card is to be used. The sensor device 14 will be described in more detail below but functions to obtain biometric readings from the user of the card to not only activate the card for use, but to ensure that the user of the card 10 is the registered owner of the card. As such, the sensor device 14 is positioned on the card 10 to provide a physical interface between the user of the card and the embedded electronic circuitry to obtain one or more measurements of biometric information from the user for processing by the embedded electrical circuitry as required.

As is described in the Applicant's co-pending International PCT Patent Application No. PCT/AU2013/000834, the sensor device may include appropriate circuitry to detect electrokinetic energy associated with the user as the user makes contact with the sensor device 14 to facilitate activation or "powering-up" of the card 10. This activation can be performed as part of the sensing function such that the sensor device not only reads the user's biometrics but also uses the energy associated therewith to activate the device for use.

Whilst the card 10 is depicted as comprising a sensor device 14 for taking biometric readings from a user as the user contacts the card, the card 10 may also be able to communicate with one or more remote sensor devices that may be worn or carried by the user and which are able to transmit biometric readings taken from the user at the remote site for processing by the embedded electrical circuitry of the card. Such body worn sensor devices may include wrist or arm band devices, implanted devices or any other form of device that is attached to the user's body and is capable of taking biometric readings from the user.

Figure 2:
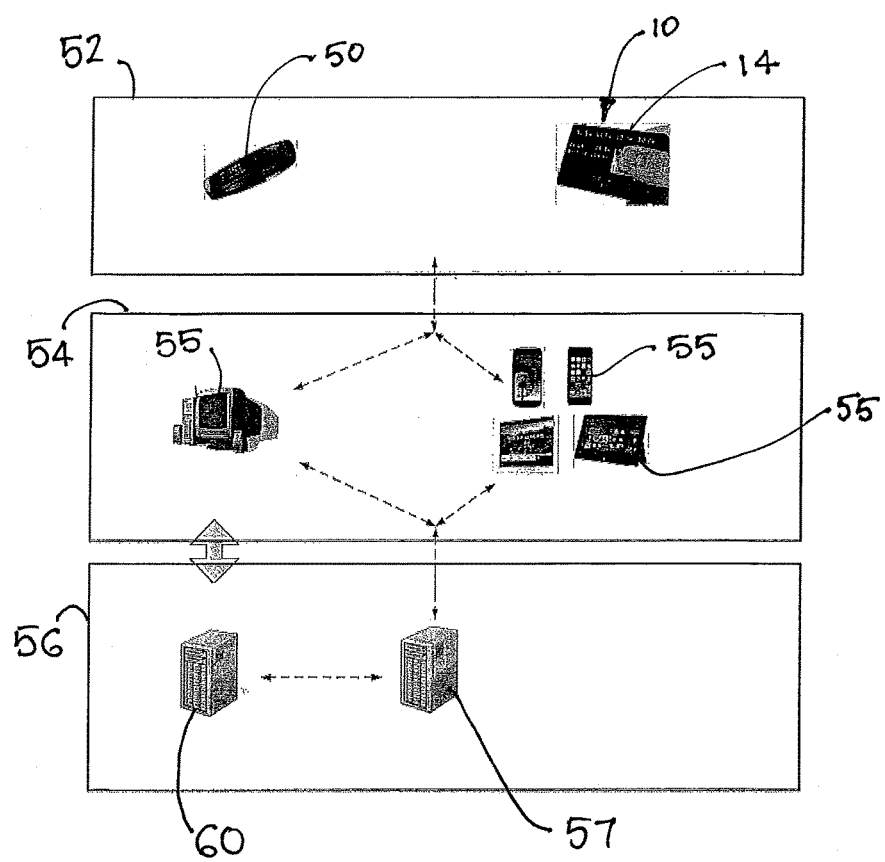
FIG. 2 is a block diagram representing the system of the present invention for facilitating an exchange of information between a user and a third party.

The overall system of the present invention is depicted in FIG. 2. The overall system essentially comprises three separate sub-systems 52, 54, 56 to facilitate a secure transaction of information between the user's card 10 and a third party 60, such as a merchant or financial institution.

Sub-system 52 generally comprises the initiating componentry of the present invention, namely the sensor device 14 that is integrated with the card 10, remote sensors 50 and embedded circuitry provided within the card 10 to validate the user of the card 10 at the point at which the card is being used. The card 10 may also contain relevant electronic componentry to facilitate processing of the appropriate information for transmission to sub-system 54.

Sub-system 54 generally comprises communication devices 55 which contain the necessary software to facilitate the exchange of information from the card 10 to the third party 60 over a network. The communication devices 55 may be in the form of personal computers, laptops, mobile phones, tablets, or any other similar electronic device that stores appropriate software application to facilitate the secure connectivity with the remote third party for the transmission of the information from the card 10 to the sub-system 56.

Sub-system 56 generally comprises a remote server 57 that manages the transfer of data between the card 10 and the third party 60. The remote server 57 may co-ordinate the transfer of information between the third party 60 and the user of the card 10 and may comprise software to encrypt transactions with the third party 60, as well as software updates for each of the communication devices 55 of sub-system 54 and the subsystem 52. Typically this transmission is over a distributed network, such as the internet to enable confidential information to be shared between the user of the card and the third party, for a variety of different purposes.

The present invention is substantially directed towards sub-system 52 which facilitates activation and authentication of the card at the point of use and is able to be used with a variety of different merchant and/or security systems.

Figure 3:
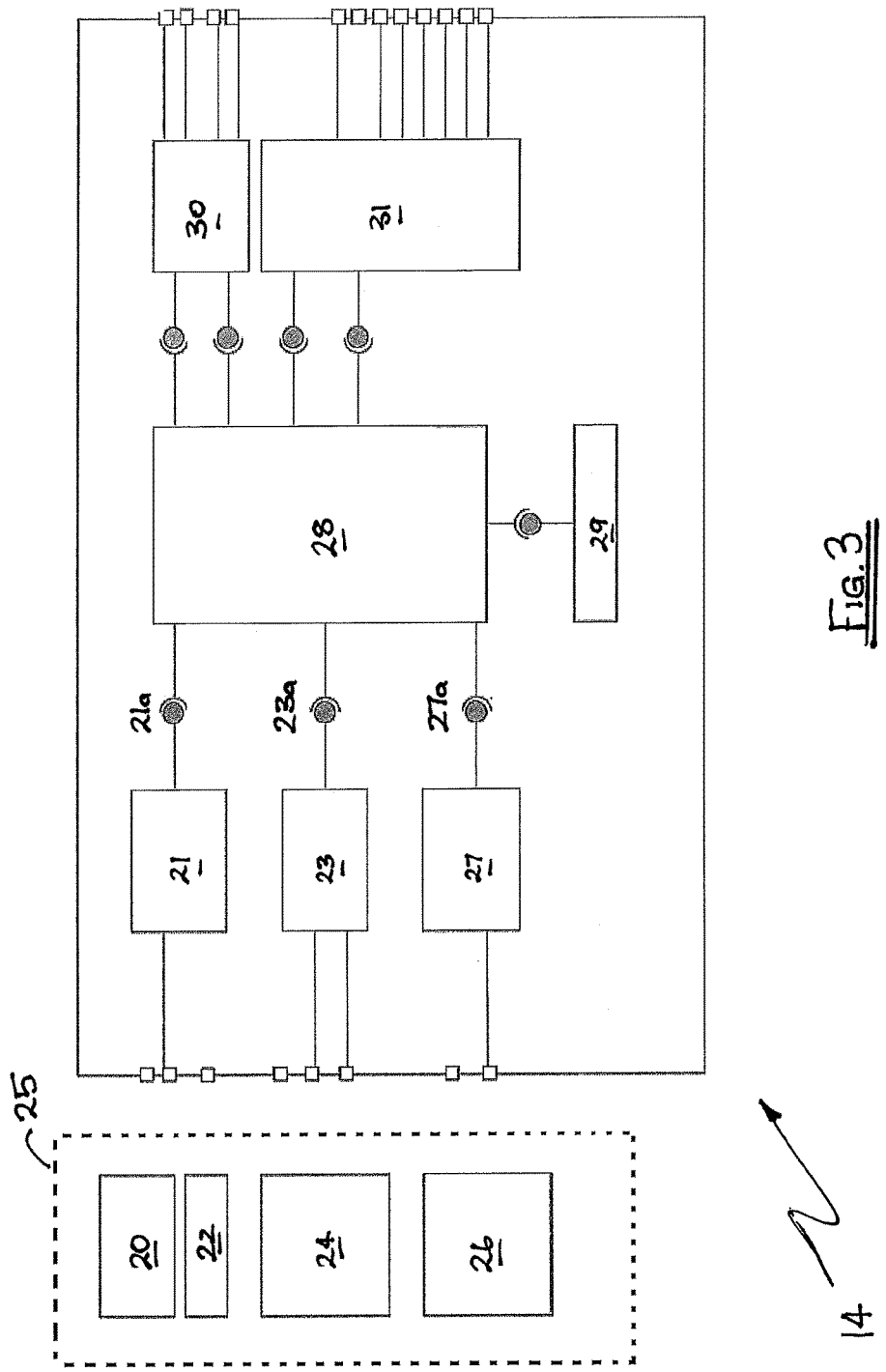
FIG. 3 is a block diagram depicting an embodiment of an internal circuit architecture of the personal device of FIG. 1.

One embodiment showing the system architecture of a sensor device 14 suitable for use with the card 10 in accordance with the present invention is depicted in FIG. 3. In this embodiment, the sensor device 14 comprises four (4) separate sensors 20, 22, 24 and 26 for obtaining biometric information from the user of the card 10. It will be appreciated that other remotely positioned sensors may also be employed for obtaining biometric information; however, for ease of understanding, the present embodiment will focus on each of the readings being taken from the sensor device 14. By providing multiple sensors, a combined biometric function can be calculated for the user and stored against their profile to provide an enhanced level of security for the device.

In this regard, sensor 20 may be in the form of a fingerprint sensor that obtains a raw image of the user's fingerprint which is then processed to perform conventional pattern matching or minutiae matching according to well known principles to assess the image taken by the sensor 20 against a stored image for the user.

Sensor 22 may be in the form of proximity sensor that is able to determine the presence or otherwise of the user which may be used as an input to activate or energise the system. Such a sensor 22 detects body energy or electrokinetic energy (EKE) associated with the user. EKE can be described as the electrical energy generated by the human body. As mammalian blood cells carry a surface charge that is proportional to the electric mobility of the cell, as those charged cells are passed around the circulatory system, an induced current is produced that creates a small varying magnetic field that can be harnessed to induce an electrical charge. The sensor 22 is able to detect this EKE charge generated by the user and can use this charge for two purposes. Firstly, the detection of a charge by the sensor 22 can be used to determine whether the contact made with the sensor is from a living person. This "liveness" detection can be used by the present system as an initial measurement to activate or energise the device to enable it to take and assess biometric readings from the user for verification purpose. Secondly, the amount of EKE and the properties of the EKE generated by an individual is unique, and these properties can be used by the present system to identify the user and authenticate that the user of the device is the registered user, as will be discussed in more detail below.

Sensor 24 may be in the form of a bio-signal sensor that is capable of measuring bioelectric signals like ECG, EMG, EDG and EEG obtained through contact with the user.

Sensor 26 may be an IR Based sensor that may be used to obtain an IR image of the user to determine location of veins on the user's hand/finger, the distribution or branching pattern of which may be unique to the user.

It will be appreciated that other types of sensors may also be employed to obtain biometric information from the user that is specific to the user. Such biometric information may include:

Electrocardiography (ECG information)—This information relates to the electrical activity of the user's heart. During each heart beat the heart emits a series of electrical discharge spikes that can be obtained from electrodes placed on the user's body. As each person's heart differs in size, anatomical configuration and orientation, there is a unique signature of voltages in each person's surface ECG reading. This information could be used as part of the user's determined biometric function;

Pulse Oximetry—This information relates to the level of oxygen saturation or dissolved oxygen that is carried by a person's blood. By obtaining a pulse oximetry wave from a user it is possible to obtain a unique biometric information from a user which can also be used to form part of the user's determined biometric function;

Arterial Pulse—Similar to obtaining pulse oximetry readings above, obtaining a peripheral arterial pulse wave reading from an individual is directly related to the user's aortic pulse, which is a unique characteristic of an individual and contains frequency characteristics which are likely to be unique between individuals. Due to the nature of the readings able to be obtained, the readings are able to be analysed using standard techniques such as Fast Fourier Transform (FFT) and machine learning system techniques;

Trans Hand Impedance—By determining the capacitance of the user's hand it may be possible to use this information as part of the user's determined biometric function;

Pattern of Dorsal Knuckle skin folding—Readings of the user's folding pattern on the dorsal surfaces of the knuckles may be taken as a biometric reading for use in determining the user's biometric function. A charge coupled device (CCD) is able to capture such images and the images could be processed, sorted and classified accordingly;

Pattern of Palmar Crease Lines—A sensor may take an image of the user's palm to determine the presence of unique crease lines for use in generating the user's biometric function;

Hand Morphology: A sensor may take an image of the size and shape of the user's fingers and/or hand and process the information to characterise the information for use as part of the user's biometric function.

It will be appreciated that while each of the above types of biometric information provides unique data about the user which can be used to form part of the registered user's calculated biometric function and to detect whether the detected user's biometric information matches that of the registered user, other user specific biometric information may also be obtained for such purposes. In this regard, the sensors for obtaining these readings may be worn by the user or implanted within the user and be capable of transmitting data via a wireless link to the embedded electronics stored within the card 10. The biometric information may also include other information, such as password information, audio based information and iris scanning.

Referring again to FIG. 3, irrespective of the type of biometric information being obtained from the user, a number of separate sensors may preferably be incorporated in to a single integrated sensor 25. One embodiment of an integrated sensor structure is depicted as reference numeral 25 in FIG. 4.

Figure 4:
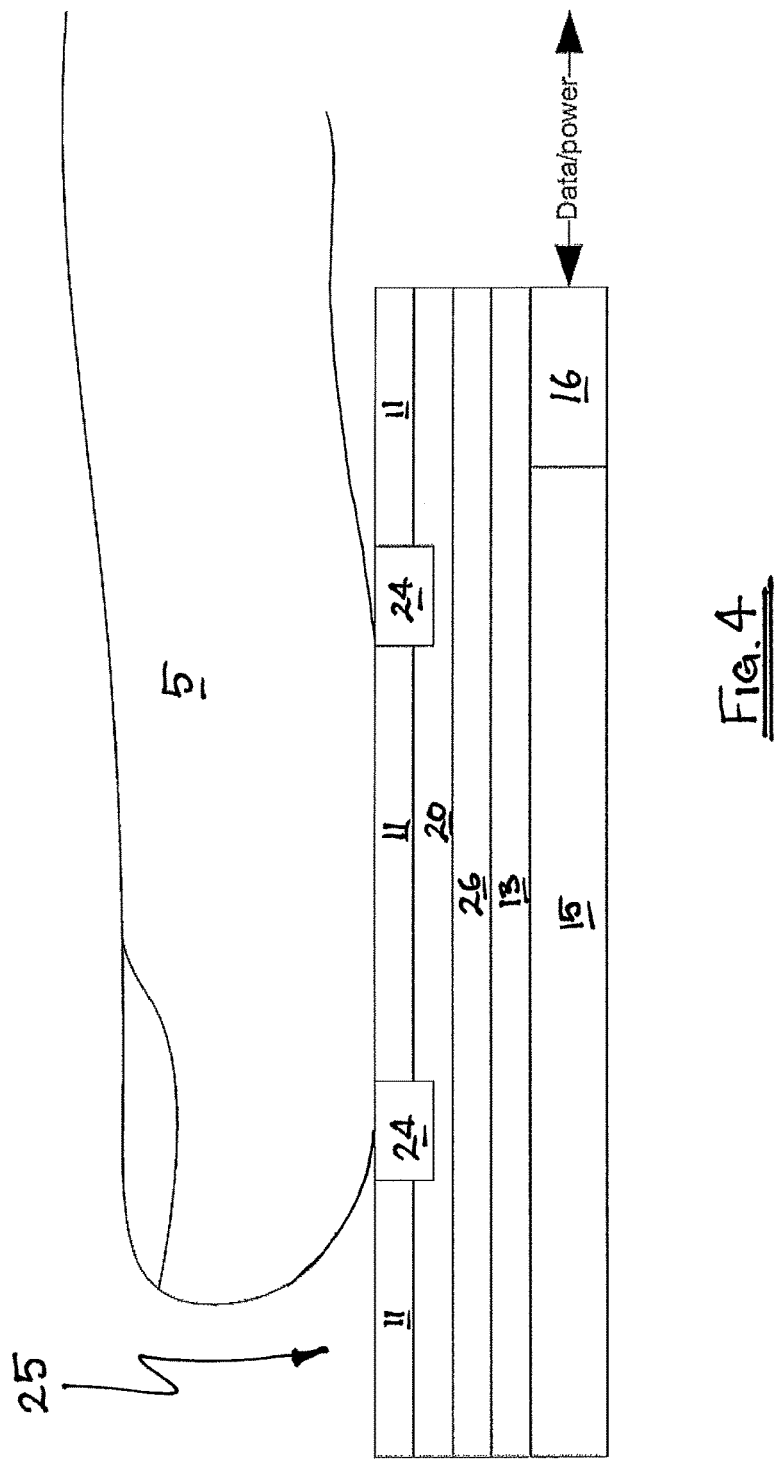
FIG. 4 is a cross sectional view of an embodiment of an integrated sensor device in accordance with the present invention.

In FIG. 4 the integrated sensor 25 is depicted as a multi-layer structure having the sensors embedded therein. In the embodiment as shown, the bioelectric signal sensors 24 are embedded within a protective film layer 11 so as to be located at the surface of the integrated sensor 25 to be in direct contact with the user's finger 5. Below the protective film layer 11, the fingerprint sensor 20 is positioned to obtain an image of the user's finger 5. The IR sensor 26 may then be positioned below the fingerprint sensor to take an IR image of the user's finger 5. Below the IR sensor 26 a printed circuit board (PCB) 13 may be provided to facilitate control of the sensors and retrieval of the relevant biometric information from the sensors 20, 24, 26. Appropriate supportive componentry 15 may be then be provided below the PCB so as to be in electrical contact therewith to facilitate measurement and transmission of the sensory signals to the embedded electronic circuitry of the card 10, by way of a connector interface 16 that facilitates two-way transfer of data and power between the integrated sensor 25 and the embedded electronic circuitry of the card 10. Other structural arrangements for forming the integrated sensor 25 are also envisaged.

Referring again to FIG. 3, each of the readings taken from each of the sensors 20, 22, 24, 26 are transferred from the integrated sensor 25 to associated pre-processing circuitry 21, 23, 27. The pre-processing circuitry processes the raw data obtained by the sensors in accordance with the type of biometric information being collected by the corresponding sensor, to generate a conditioned signal 21a, 23a, 27a. In the embodiment as shown, the circuitry of the integrated sensor is depicted as being separate to the circuitry of the card 10; however, as will be appreciated by those skilled in the art, the integrated sensor may include both the subsystem 25 and the subsystem 14 and associated circuitry and componentry and still fall within the spirit of the present invention.

Each of the conditioned signals 21a, 23a and 27a contain pre-processed data relating to the readings obtained from each of the associated sensors of the integrated sensor 25. These conditioned signals are then received by the microprocessor 28 of the embedded electronic circuitry of the card 10 for processing. The microprocessor 28 may be a DSP that is able to receive the multiple conditioned signals and convert these signals into a single user specific bio-function in accordance with a predetermined algorithm.

Figure 5:
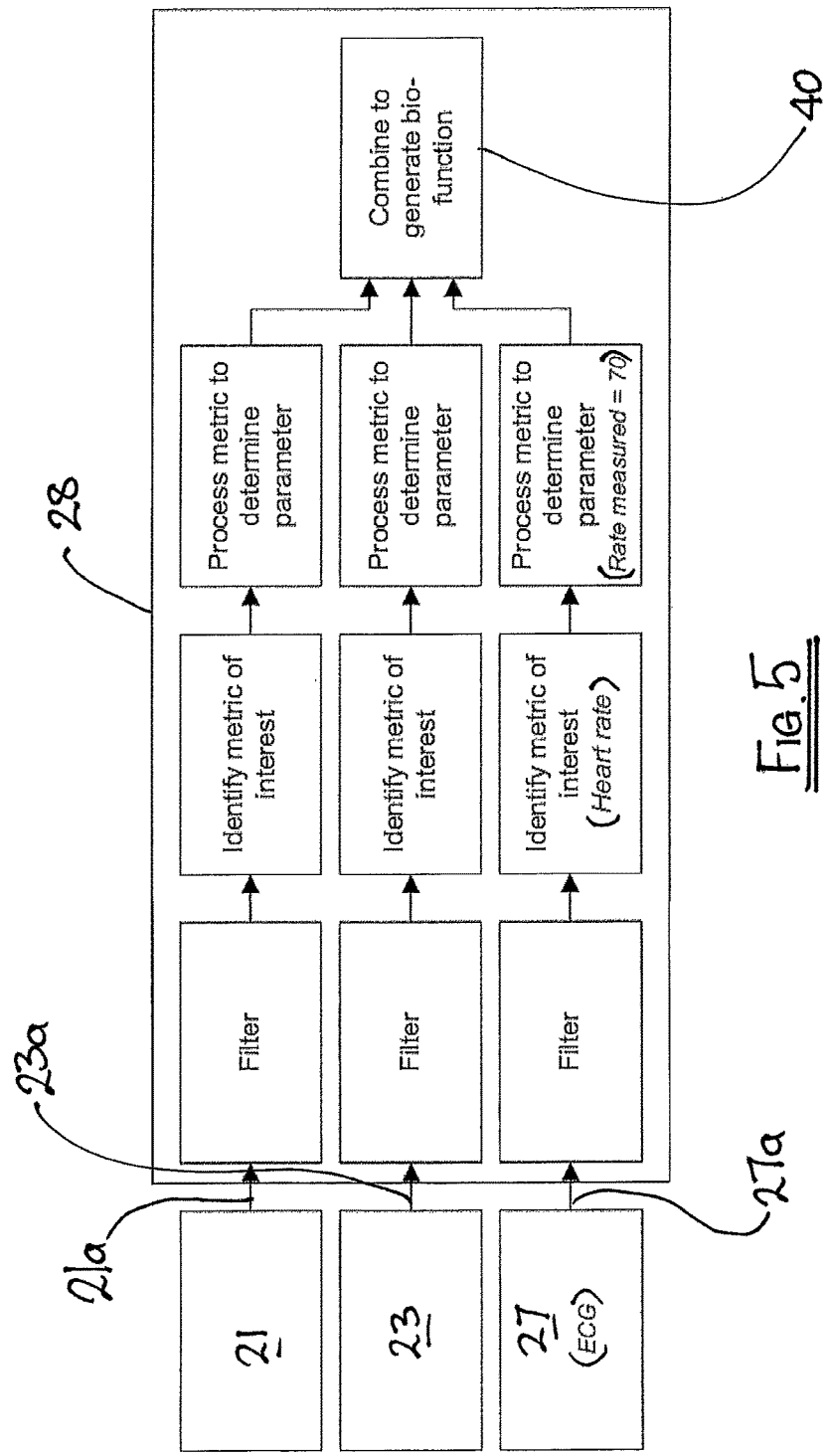
FIG. 5 is a logic diagram depicting an embodiment of the manner in which the biometric information obtained from the integrated sensor of FIG. 4 can be used to determine a detected user's bio-function.

An embodiment depicting the manner in which the microprocessor 28 processes the multiple conditioned signals 21a, 23a and 27a into the user specific bio-function 40 is shown in FIG. 5. Firstly, the microprocessor 28 filters the conditioned signals to remove any noise present therein. Following the filtering step the filtered signals are then each analysed to identify the specific metric(s) of interest in accordance with the type of signal being processed. Once the specific metric(s) have been identified the metrics are processed to determine a measured parameter that can be then used to generate the detected bio-function for the detected user.

For the conditioned signal 27a, an example is shown in FIG. 5 as to how the measured parameter is determined. Conditioned signal 27a is obtained by sensor 27 which performs an ECG analysis of the user at the integrated sensor 25. The resulting conditioned signal is an ECG signal and is received by the microprocessor 28 and filtered accordingly, to remove any noise or unwanted artefacts that may be present in the signal 27a. The signal is then analysed to identify the metric of interest, which in this example is the detected user's heart rate. This information is then extracted from the signal. Once the heart rate information is extracted the microprocessor then measures the heart rate, which in the example provided, generates a heart rate of 70 beats per minute. This information can then be used to generate the detected user's bio-function.

In order to obtain the detected user's bio-function, the bio-function may comprise one or a combination of biometric information obtained from the user when accessing the integrated sensor 25. As discussed above, for each signal the microprocessor 28 is able to isolate specific parameters of interest. As such the detected user's bio-function $f(bio)(t)$ is determined in accordance with the following equation:

$$f(bio)(t) = f(parameter_1)(t) + f(parameter_2)(t) + \ldots + f(parameter_n)(t)$$

where: $f(parameter)(t)$ is a function generated from each sensor signal

Once the detected user's bio-function $f(bio)(t)$ has been determined, this value can then be used to ascertain whether the detected user of the card is the register user of the card. As shown in FIG. 3, the microprocessor 28 is in communication with a memory 29 which is able to store and retrieve information located therein. In this regard, the microprocessor 28 may merely compare the generated detected user's bio-function $f(bio)(t)$ against a stored registered user's bio-function to assess whether the stored and detected values match. If the detected value and the stored value match, or are within a predetermined tolerance, the microprocessor may confirm that the user is authorised to proceed with the transaction and activate the card 10 accordingly.

Referring again to FIG. 3, the embedded electronic circuitry of the card 10 may include a power management system 30 which provides power to the relevant components of the system under the control of the microprocessor 28.

Further, the microprocessor 28 may also be in communication with an external interface controller 31 that includes a transmitter/receiver and appropriate protocol software to facilitate secure transmission between the card and an external communication device, as discussed previously. Such a transmitter/receiver may also receive data from remotely located sensor devices as previously discussed. The protocol software embedded within the device may prevent communication of the embedded electronic circuitry of the card 10 with any remote device that does not contain the appropriate software application.

As the system of the present invention is able to take multiple biometric measurements from the user of the device, the system is able to provide multiple levels of authentication using one or more of these measurements. In his regard, as is previously discussed, as a primary level of authentication, the system may take a reading of the user's electrokinetic energy (EKE) to energise the device after which the user's fingerprint may be used for authentication. In such an arrangement, the detection of EKE upon the user contacting the sensor surface provides a first initial authentication that the user is present and is alive. This is sufficient to facilitate energisation of the device, typically by using the presence of EKE to trigger the power supply of the device to power the embedded electronic circuitry so that the device becomes operational. This is then followed by the device taking a reading and comparison of the user's fingerprint. As a second level, or Level 2 authentication, a further step of making a reading and comparison of the user's ECG data can be made as part of the assessment. As a third level, or Level 3 authentication, an additional step of taking a reading of the user's pulse oximetry may be added. Similarly, an additional level of verification may assess the parameters of the detected EKE from the user against stored parameters to determine whether the user's EKE profile matchers that of the registered user's EKE profile stored with the device. Other levels and combinations of biometric readings may also be employed as discussed below in relation to Table 1, depending upon the security level requirement.

TABLE 1

| Security Level | Authentication methods |
|---|---|
| Level 1 | EKE, fingerprint |
| Level 2 | EKE, fingerprint, ECG |
| Level 3 | EKE, fingerprint, ECG, Pulse oximetry |
| Level 4 | EKE, fingerprint, ECG, Pulse oximetry, EKE profile |

Figure 6:
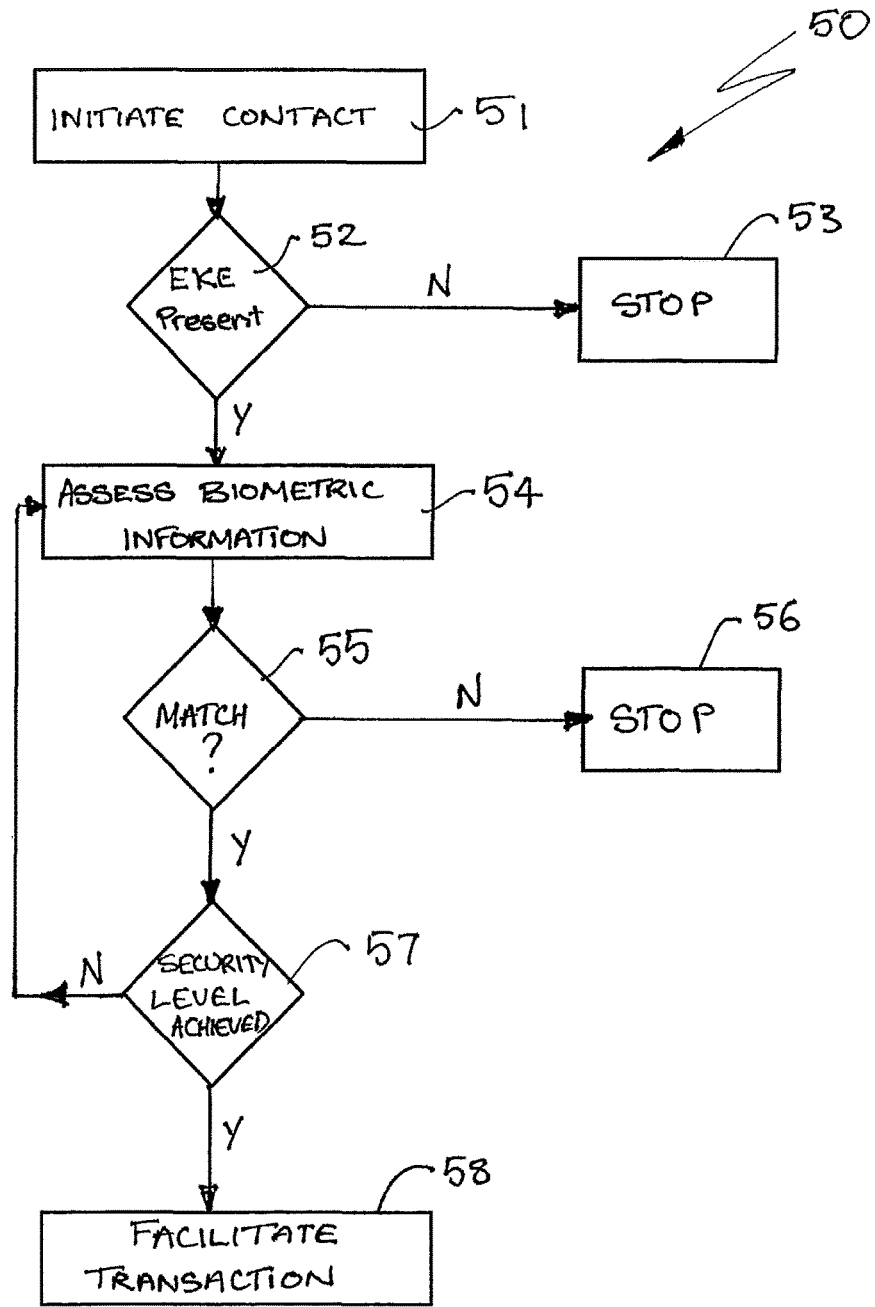
FIG. 6 is a flow chart depicting an embodiment of a method for verifying an identity of a user of the device.

It will be appreciated that the manner in which the card 10 is activated or used may vary in accordance with the specific transaction being undertaken and is outside the scope of the present invention. However, one preferred method 50 by which the system may be employed is depicted in FIG. 6.

In the method 50, in step 51, the user may initiate contact with the integrated sensor of the device to initiate a transaction. The transaction may be in the form of a product purchase where the device is a credit card or the like. This contact may involve the user placing their finger or thumb on the integrated sensor pad as discussed previously and depicted in FIG. 4.

At step 52, the integrated circuit contained within the device detects the presence of electrokinetic energy (EKE) associated with the user's contact and if there is no detection of electrokinetic energy (EKE), the device determines that the contact is not made be a "living" human and does not energise the device for usage. As such, the device remains in a non-activated state as depicted by step 53.

If, at step 52, the integrated circuit of the device detects the presence of EKE and hence makes an initial assessment that the user is a living being, the device is then energised and power is supplied to the remaining elements of the integrated circuit to enable a reading of biometric information from the user to be obtained by the integrated sensor at step 54.

In accordance with Table 1 above, at step 54, the integrated sensor of the device may take a reading of the user's fingerprint as an initial authentication step. In step 55, the reading taken by the user's fingerprint is assessed against a reading stored in the memory of the integrated circuit to determine whether the reading is a match with the stored biometric information. If the fingerprint reading does not match the stored reading, then the transaction is stopped and the device is returned to a non-activated state as depicted by step 56.

If step 55 determines that the fingerprint reading obtained in step 54 is a match with the fingerprint data stored within the integrated circuit, the integrated circuit checks to see the security level setting for the transaction in step 57. If the security level setting is a Level 1 setting or equivalent, as indicated in Table 1, the integrated circuit software will determine that the level of security has been achieved and will allow the transaction to proceed in step 58.

If the integrated circuit software in step 57 determines that the security level for that transaction is greater than Level 1, the integrated circuit software will request a further assessment of biometric data to be taken from the user and will return to step 54. In accordance with the security levels discussed above in Table 1, the integrated sensor of the device will take an ECG measurement for assessment against ECG data stored for the user in the integrated circuit memory in step 55. This cycle will be further repeated; depending upon the security level set for the transaction, until either the transaction is facilitated or stopped.

It will be appreciated that the personal information stored on the card/device is only available for transaction/authentication purposes after the transaction is facilitated in step 58. Prior to this, the card is inactive for use and no access to the personal information stored on the card is allowed.

It will be appreciated that the system of the present invention is able to utilise multiple sensor technologies and receive data from such technologies for assessment by the single device to determine the identity of the user. Whilst the present invention has been described incorporating multiple sensors into a single device, it will be appreciated that the system of the present invention could communicate with multiple sensor devices worn or attached to a user to obtain and process the information within the single device. In this regard, the multiple remote sensor devices may be wirelessly connected to communicate with the single device.

The present invention could also be used to monitor a user's bio-signals over an extended period of time so as to compensate for changes in these signals as the user ages or changes over time. By providing a system that continually "learns" from the user, improved security is possible to protect the information contained within the card from unauthorised access. In this regard, the equation described above for determining the user's bio-function may include a time component. This may be particularly relevant when the data collected relates to the user's blood pressure, pulse rate or similar biometric readings that may change over time. The present invention may also be able to receive data from sensors including audio (voice) recognition sensors, iris scanning sensors and electrocorticography (ECoG) sensors to provide improved verification of identity.

It will be appreciated that the system and method of the present invention has multiple applications which can enable the user to make secure financial transactions; store personal identifying information (i.e. passport, driver license); and provide an identity verification service for non-financial transactions, such as website log-in and the like. The system and method of the present invention could also securely store and control the release of valuable information such as patient medical records, which enables a user to carry such information in a convenient manner without fear of the information becoming publically available.

By providing a system and method in accordance with the present invention, it is possible to provide a system that is able to provide different levels of identification verification. It will be appreciated that the level of identification verification may vary depending upon the transaction being undertaken. For example, the amount of identification verification to access a website, such as Facebook®, may be considerably lower than that required to conduct a financial transaction. By collecting multiple data relating to a variety of biometric readings associated with the user, the present system and method is able to provide a tiered level of identity verification, whereby the combination of sensors used may vary depending upon the level of authentication required. In this regard, a "points system could be employed which determines the level of authentication required.

Throughout the specification and claims the word "comprise" and its derivatives are intended to have an inclusive rather than exclusive meaning unless the contrary is expressly stated or the context requires otherwise. That is, the word "comprise" and its derivatives will be taken to indicate the inclusion of not only the listed components, steps or features that it directly references, but also other components, steps or features not specifically listed, unless the contrary is expressly stated or the context requires otherwise.

Orientational terms used in the specification and claims such as vertical, horizontal, top, bottom, upper and lower are to be interpreted as relational and are based on the premise that the component, item, article, apparatus, device or instrument will usually be considered in a particular orientation, typically with the device uppermost.

It will be appreciated by those skilled in the art that many modifications and variations may be made to the methods of the invention described herein without departing from the spirit and scope of the invention.

The claims defining the invention are as follows:
1. A device for facilitating an exchange of personal information between a user and a third party comprising:
   a body configured to be carried by a user;
   a contact pad provided on a surface of the body, the contact pad being configured to be contacted by the user and comprises a plurality of sensor elements for taking a plurality of different types of biometric readings from the user for verification purposes in relation to a verification set of biometric data for the user;
   a data storage module provided with said body for storing personal data about said user together with said verification set of biometric data for the user;
   a processor for processing said different types of biometric readings obtained by the plurality of sensor elements and comparing said biometric readings against the user's stored set of verification biometric data to confirm identity of the user, where a number of different types of biometric readings corresponding to an assessment to be taken is determined by said processor based on a defined level of security for the exchange of personal information with the third party, the processor being further configured to facilitate a transfer of said user's personal data with the third party upon confirmation of the identity of the user based on the required security level; and a power supply provided with said body, the power supply being selectively connectible to the processor to supply power to the processor when the presence of electrokinetic energy (EKE) associated with contact by the user with said contact pad energizes said device, and if there is no detection of electrokinetic energy (EKE), the processor determines that the contact is not made by a "living" human and does not connect the power supply to the processor for facilitating the exchange of personal information.

2. The device according to claim 1, wherein the body comprises a card.

3. The device according to claim 1, wherein the contact pad comprises a contact surface having a plurality of sensor elements embedded therein.

4. The device according to claim 3, wherein the plurality of sensor elements are arranged in one or more layers to provide a plurality of biometric readings from said user when said user is in contact with said contact pad.

5. The device according to claim 1, wherein the contact pad is configured to receive a finger or thumb of said user.

6. The device according to claim 1, wherein at least one of the plurality of sensor elements comprises a sensor element for measuring the electrokinetic energy of the user upon contact with the contact pad.

7. The device according to claim 6, wherein at least one of the plurality of sensors further comprises a sensor element for measuring at least one of electrocardiography data, electromyogram data, pulse oximetry data, arterial pulse data, trans hand impedance data of the user.

8. The device according to claim 1, wherein the data storage module comprises a memory for storing said personal data and said set of user verification biometric data.

9. The device according to claim 8, wherein the personal data stored in said memory comprises data associated with said user's financial and/or private particulars.

10. A method for verifying an identity of a user of a device for facilitating an exchange of information between the user and a third party, comprising:
facilitating direct contact between the user and the device;
determining the presence of electrokinetic energy associated with said direct contact;
selectively connecting on the device a processor to a power supply for supplying power to the processor when the presence of electrokinetic energy associated with the direct contact by the user is detected to energize the device, and if no electrokinetic energy is detected, determining that the contact is not made by a "living" human and the selective connection of the power supply to the processor is not made;
obtaining a plurality of different types of biometric readings from said user through said direct contact;
assessing whether the obtained biometric reading from said user matches with a set of stored verification biometric readings taken from a registered user of the device;
determining a level of security set for said exchange of information, where a number of different types of biometric readings corresponding to an assessment to be taken is determined based on the determined level of security for the exchange of information with the third party;
verifying the number of different types of the obtained biometric readings based on the security level against the set of stored verification biometric readings; and
facilitating said exchange of information between said user and said third party upon said level of security being met.

11. The method according to claim 10, wherein the step of facilitating direct contact between the user and the device comprises providing a contact pad io on said device for receiving said user's finger or thumb thereon.

12. The method according to claim 11, wherein the contact pad comprises a plurality of sensor elements for taking a plurality of biometric readings from said user.

13. The method according to claim 12, wherein the step of determining the presence of electrokinetic energy associated with said direct contact comprises one of said plurality of sensor elements detecting said electrokinetic energy.

14. The method according to claim 13, wherein upon said sensor element not detecting the presence of electrokinetic energy associated with the direct contact, the device is retained in a deactivated state.

15. The method according to claim 10, wherein the step of facilitating the supply of electrical power to the device comprises a processor provided with said device selectively connecting the device to a power supply.

16. The method according to claim 12, wherein the step of obtaining a biometric reading from said user through said direct contact comprises obtaining any one or more of one of electrokinetic energy data, electrocardiography data, electromyogram data, pulse oximetry data, arterial pulse data, trans hand impedance data from the plurality of sensor elements.

17. The method according to claim 10, wherein the step of determining whether the level of security set for the exchange of information has been set comprises determining whether the number of assessments of the obtained biometric data against the stored biometric data has been met.

18. The method according to claim 17, wherein if the level of security set for the exchange of information has not been met, further assessments of the obtained biometric data against the stored biometric data will be made.

* * * * *